(12) United States Patent
Kirmaier et al.

(10) Patent No.: US 12,168,430 B2
(45) Date of Patent: Dec. 17, 2024

(54) TRAILER BRAKE CONTROL SYSTEM

(71) Applicant: AGCO International GmbH, Neuhausen (CH)

(72) Inventors: Philipp Kirmaier, Marktoberdorf (DE); Richard Heindl, Marktoberdorf (DE); Tobias Albrecht, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 281 days.

(21) Appl. No.: 17/757,399

(22) PCT Filed: Dec. 1, 2020

(86) PCT No.: PCT/IB2020/061317
§ 371 (c)(1),
(2) Date: Jun. 15, 2022

(87) PCT Pub. No.: WO2021/123984
PCT Pub. Date: Jun. 24, 2021

(65) Prior Publication Data
US 2023/0009316 A1 Jan. 12, 2023

(30) Foreign Application Priority Data
Dec. 19, 2019 (GB) ...................................... 1918835

(51) Int. Cl.
*B60T 7/20* (2006.01)
*B60T 8/17* (2006.01)

(52) U.S. Cl.
CPC .............. *B60T 7/20* (2013.01); *B60T 8/1701* (2013.01); *B60T 2250/00* (2013.01); *B60T 2260/04* (2013.01); *B60T 2270/413* (2013.01)

(58) Field of Classification Search
CPC . B60T 7/20; B60T 7/203; B60T 7/206; B60T 8/1701; B60T 8/1708; B60T 2250/00; B60T 2260/04; B60T 2270/40
(Continued)

(56) References Cited

U.S. PATENT DOCUMENTS

2014/0095043 A1* 4/2014 Gomez ...................... B60T 7/20
701/70
2016/0137204 A1* 5/2016 Morselli ............... B60T 8/1708
701/53
(Continued)

FOREIGN PATENT DOCUMENTS

DE 102007053320 A1 5/2009
DE 102016104453 A1 9/2017
(Continued)

OTHER PUBLICATIONS

UK Intellectual Property Office, Search report for UK Priority Application No. GB1918835.8, dated May 4, 2020.
(Continued)

*Primary Examiner* — Erick R Solis

(57) ABSTRACT

A trailer braking system comprises a vehicles having a continuously-variable hydrostatic transmission, and a trailer coupled for towing by the vehicle and having an associated braking system operable from the vehicle. The vehicle transmission includes a first pressure sensor arranged to measure a fluid pressure at a predetermined point within the transmission, and a rotation sensor arranged to determine a rotation direction of a predetermined component in a driveline of the vehicle. A control unit coupled to the first pressure sensor and rotation sensor determines when a PUSH condition exists based on a particular combination of pressure and rotational direction, and operates the trailer (Continued)

brakes in response. One or more back-up systems to confirm the existence of a PUSH condition may be provided.

8 Claims, 3 Drawing Sheets

(58) Field of Classification Search
USPC .......................................................... 701/70
See application file for complete search history.

(56) References Cited

U.S. PATENT DOCUMENTS

2016/0332606 A1\* 11/2016 Buchner .................. B60T 7/20
2024/0001894 A1\* 1/2024 Sutton .................. B60T 13/662

FOREIGN PATENT DOCUMENTS

| EP | 2269880 | A1 | | 1/2011 | |
|----|---------|----|----|--------|----|
| EP | 2729334 | B1 | | 10/2011 | |
| EP | 3216333 | | \* | 9/2017 | ........... A01B 59/042 |
| WO | 09059698 | A2 | | 5/2009 | |
| WO | 2017/050632 | A1 | | 3/2017 | |

OTHER PUBLICATIONS

European Patent Office, International Search Report related to International Patent Application No. PCT/IB2020/061317, mail date Feb. 24, 2021.

\* cited by examiner

| Direction | Push/pull | PUSH-PULL detection | | | |
|---|---|---|---|---|---|
| | | Rotational speed sensor CVT | Pressure sensor 23 | Pressure sensor 22 =Pressure UHC | Pressure LHC (not measured) |
| STANDSTILL | NO | 0 | PSYS | PSYS | PSYS |
| FORWARD | PULL | POSITIVE | PH | PH | PSYS |
| REVERSE | PULL | NEGATIVE | PH | PSYS | PH |
| FORWARD | PUSH | POSITIVE | PH | PSYS | PH |
| REVERSE | PUSH | NEGATIVE | PH | PH | PSYS |

Fig. 3

TRAILER BRAKE CONTROL SYSTEM

CROSS-REFERENCE TO RELATED APPLICATIONS

This application is a national phase entry under 35 U.S.C. § 371 of International Patent Application PCT/IB2020/061317, filed Dec. 1, 2020, designating the United States of America and published in English as International Patent Publication WO 2021/123984 A1 on Jun. 24, 2021, which claims the benefit of and priority from United Kingdom Application No. 1918835.8, filed Dec. 19, 2019, the entire disclosure of each of which is hereby incorporated by reference.

TECHNICAL FIELD

The present disclosure relates to a system and method for the operation of a vehicle trailer brake.

BACKGROUND

Many vehicles are often provided with attached trailers for the transportation of goods and materials. For large-scale use, and in particular in the area of agricultural tractors, such trailers may be provided with trailer-side braking systems to allow for safe control of the trailer, and to prevent jack-knifing or skidding of the trailer when braking.

In the EU, the vehicle braking requirements (RVBR) of the so-called "Mother Regulation" introduces increased safety requirements for the operation of trailer brake systems in the agricultural sector. In particular, agricultural trailers are required to have trailer braking systems responsive to user actuation, where such trailer braking systems must provide for improved response times, and have failsafe systems which act to brake the towed trailer in the event of a systems or communications fault with the towing vehicle.

International Patent Application Publication WO 2017/050632, "A Vehicle Trailer Brake System and Method," published Mar. 30, 2017, describes a method of controlling a hydraulic trailer brake system using a hydraulic fluid supply provided on a vehicle, wherein a control line (CL) and a supplementary line (SL) are arranged between the vehicle and a vehicle trailer for supply of hydraulic fluid to and from the trailer. The method comprises monitoring the hydraulic fluid pressure in the CL and in the SL, receiving a user braking input, and controlling the pressure of hydraulic fluid in the CL and in the SL to control the operation of the trailer brake system. The controlling is based on a combination of the received user braking input and the detected pressure levels in the CL and SL.

Such an arrangement is not applicable where engine braking is used to slow the vehicle, relying on internal resistance in the vehicle (from the transmission and other components) rather than the application of a service or parking brake of the vehicle.

The detection of a critical jack-knife situation is a major issue here. Jack-knifing occurs when the trailer pushes the towing vehicle such as a tractor (known as PUSH condition) rather than the tractor pulling the trailer (known as a PULL condition). In general terms, a PUSH condition exists if the torque input to the vehicle wheels (which are driven by the trailer inertia) is greater than the nominal torque supplied by the engine (in certain conditions). It is also known to refer to a PUSH condition as a PUSH mode and to refer to a PULL condition as a PULL mode.

A known parameter used to detect PUSH condition in trucks is the difference of the set engine speed and the current engine speed. When going downhill, the trailer pushes the truck tractor and thereby wheels begin to rotate faster, so the setting of the engine speed (depending on the desired speed) and the speed of the engine (transmitted via wheels) would show a deviation. In agricultural vehicles such as farm tractors, the engine speed difference may not be considered as various secondary drives (PTO, hydraulic supply pump) may have an influence. The result is that PUSH/PULL conditions may not be detected by engine speed.

Alternative approaches, such as comparing torque supply by engine with the torque transmitted via wheels (indicating a PUSH condition), fail due to complex physical relationships and/or the fact that direct torque measuring requires a high degree of effort.

Further alternative approaches, requiring the provision of two or more pressure sensors in a continuously-variable transmission to determine PULL/PUSH conditions, are described in European Patent 2,269,880 B1, "Brake for a Traction Vehicle Trailer Combination," granted Jul. 29, 2015, and German Patent Application Publication 10 2016 104453, "Agricultural Train with a Towing Vehicle and Trailer," published Sep. 14, 2017.

BRIEF SUMMARY

In some embodiments, a trailer braking system comprises a vehicle having a continuously variable hydrostatic transmission; and a trailer coupled for towing by the vehicle, the trailer having two or more wheels with an associated braking system operable from the vehicle. The vehicle transmission includes a first pressure sensor arranged to measure a fluid pressure (PH, PSYS) at a predetermined point within the transmission, and a rotation sensor arranged to determine a rotation direction of a predetermined component in a driveline of the vehicle. The system further comprises an electronic control unit (ECU) coupled to the first pressure sensor and rotation sensor, the ECU being configured to determine when a PUSH condition exists based on a particular combination of pressure and rotational direction, and further configured to operate the trailer brakes in response to a PUSH condition. This arrangement based on two direct measurements from the transmission is less prone to problems than e.g., torque measurement. This arrangement is simpler in that it does not require two pressure sensors to identify a PUSH condition. However, when a second pressure sensor is available, the above arrangement facilitates the use of such a second sensor in a secondary or back-up detection to improve overall safety.

The vehicle transmission may include a hydrostatic pump and a hydrostatic motor connected to the pump by a first fluid line, with the first pressure sensor being arranged to measure a fluid pressure in the first fluid line. The rotation sensor may be configured to measure rotation direction and speed for an output shaft of the hydrostatic motor.

In a further aspect, the trailer braking system comprises a second (redundant) system configured to determine when a PUSH condition exists, with the ECU being configured to determine whether there is an expected correlation between the determinations by the first and second systems as a precondition to operating the trailer brakes. In one configuration, the redundant system may comprise a further rotation sensor configured to measure rotation direction at a predetermined location in a driveline of the vehicle, with the ECU being configured to determine whether there is an expected correlation between the outputs of the first and second rotation sensors as a precondition to operating the trailer brakes. In an alternative configuration, a second pressure sensor configured to measure a fluid pressure at a second predetermined point within the transmission may be provided, with the ECU being configured to determine whether there is an expected correlation between the outputs of the first and second pressure sensors as a precondition to operating the trailer brakes.

BRIEF DESCRIPTION OF THE DRAWINGS

Further advantages will become apparent from reading the following description of specific embodiments in which:

FIG. 3 is a table identifying differing pressure and rotational measurements in the transmission of FIG. 2.

DETAILED DESCRIPTION

In the following detailed description and drawings, embodiments are described in detail to enable practice of the disclosed systems. Although described with reference to these specific embodiments, it will be understood that the claims are not limited to these embodiments. But to the contrary, the disclosure includes numerous alternatives, modifications, and equivalents as will become apparent from consideration of the following detailed description.

Figure 1:
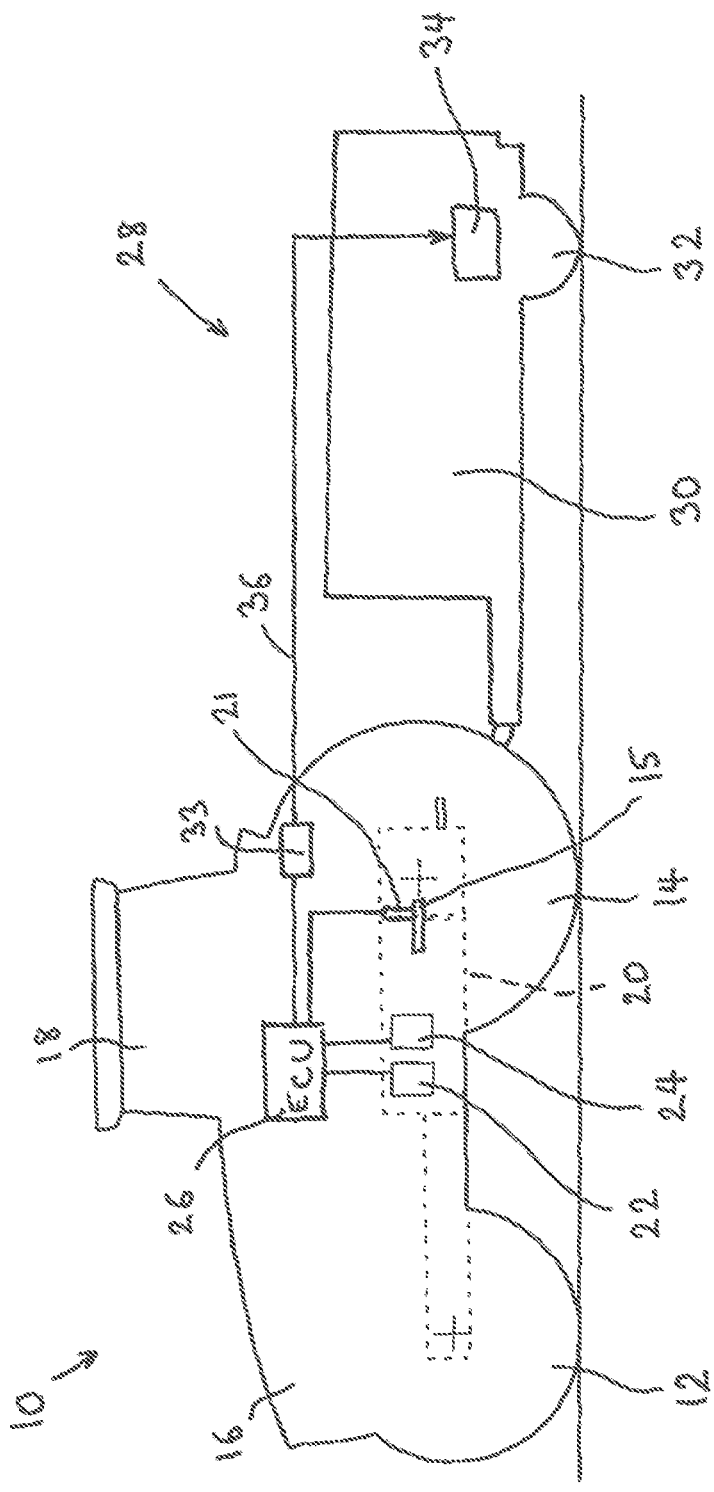
FIG. 1 shows a vehicle towing a trailer equipped with a trailer braking system.

FIG. 1 illustrates a vehicle in the form of an agricultural tractor 10. The tractor 10 comprises front wheels 12 and rear wheels 14, a forward engine section 16 and a cab section 18. The tractor 10 includes a hydrostatic transmission 20 driven by the engine and providing motive power to the wheels 12, 14 via a driveline 15 including a speed sensor 21. The transmission 20 includes at least one pressure sensor 22, 23 and a rotation sensor 24 connected with an electronic control unit (ECU) 26. The operation of the sensors 21, 22, 23, 24 and ECU 26 in the control of trailer braking is described further below. It will be recognized that ECU 26 is suitably a programmable device that may control a number of features and functions of the tractor 10.

The tractor 10 is coupled with a towed trailer 28. The trailer 28 comprises a trailer body 30, and at least one pair of wheels 32. A trailer brake system 34 is provided on the trailer 28, which is connected (as schematically represented by control line 36) with a hydraulic or pneumatic trailer brake valve 33 system provided on the tractor 10. The trailer brake valve 33 is operated under control of the ECU 26. It will be understood that hydraulic fluid lines (not shown) may extend between the tractor 10 and the trailer 28, for powering the braking system 34 of the trailer 28.

Figure 2:
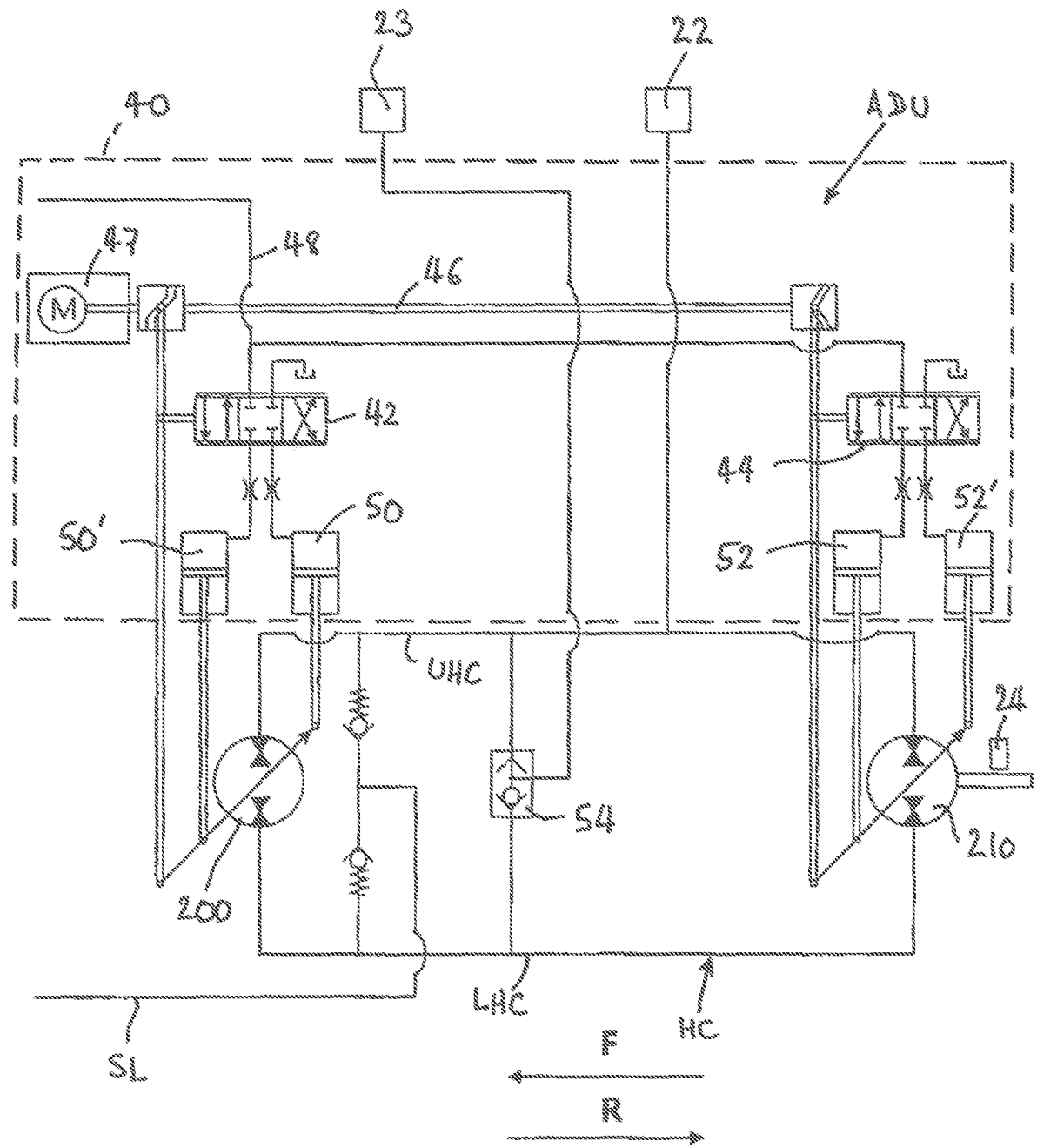
FIG. 2 represents components in the transmission of the vehicle of FIG. 1.

FIG. 2 shows a schematic representation of an adjustment unit ADU and a hydraulic power unit of the transmission 20. In this situation, the components belonging to the adjustment unit ADU are located inside the rectangle defined by the broken line 40, and the components belonging to the transmission 20 are located outside the rectangle defined by the broken line 40.

The hydraulic power unit of the transmission 20 has a pair of hydrostats 200, 210, wherein hereafter the hydrostat 200 is designated as the hydraulic pump 200 and the hydrostat 210 as the hydraulic motor 210. The hydrostats 200, 210 illustrated in FIG. 2 are axial piston machines of oblique-axle design, of which the delivery/intake volume is changed by the pivoting of the axis of rotation of the pistons to an axle drive shaft, not shown.

By a first valve unit 42 allocated to a hydraulic pump 200, and by a second valve unit 44 allocated to the hydraulic motor 210, the individual pivot angle of the hydraulic pump 200 and/or of the hydraulic motor 210 can be adjusted.

In this situation, depending on the specified revolution speed transmission ratio, an actuator element 46 is rotated by an actuator motor 47. The actuator motor 47 is in this case controlled by a control device, such as the ECU 26 shown in FIG. 1. Because the valve units 42, 44 are coupled to the actuator element 46, these valve units 42, 44 are displaced corresponding to the actuator element 46. As a result, oil present in a line 48 can flow into a cylinder 50, 50', 52, 52' allocated to the valve unit 42, 44.

Due to the displacement of the actuator element 46, the oil flow is accordingly directed out of the line 48 into the cylinders 50, 50', 52, 52' and with it the pivot angle of the hydraulic pump 200 and of the hydraulic motor 210 is adjusted. The pivot angle, and therefore the delivery volume of the hydraulic pump 200 and the intake volume of the hydraulic motor 210 can accordingly be changed. This makes it possible for the revolution speed of the axle drive shaft, not shown in FIG. 2, to be adjusted, and with it the revolution speed transmission ratio of the transmission 20.

In addition, the hydraulic pump 200 is connected by fluid means to the hydraulic motor 210 by means of a fluid circuit HC. The fluid circuit HC in this situation has an upper circuit UHC and a lower circuit LHC. In this situation, the direction of the arrow F represents a flow direction of the fluid located inside the hydraulic circuit HC during forwards travel of the tractor 10 and the direction of the arrow R represents a flow direction of the fluid during reverse travel of the tractor 10.

By the first pressure sensor 22, the pressure value pUHC prevailing in the upper circuit UHC can be measured. This pressure value pUHC is then sent to the ECU 26 represented in FIG. 1. Moreover, both the pressure in the upper circuit UHC as well as the lower circuit LHC are conducted by a shuttle valve 54 to a second pressure sensor 23 in order to measure the pressure value pHCmax.

In this situation, the shuttle valve 54 in the transmission 20 is designed to communicate to the second pressure sensor 23 the greater of the two pressures present in the upper circuit UHC or of the lower circuit LHC as a pressure value pHCmax. When the tractor 10 is stationary, the second pressure sensor 23 issues a system pressure arising in the upper circuit UHC or the lower circuit LHC as pressure value pHCmax. The second pressure sensor 23 serves the purpose to detect if the transmission is facing any load, which is explained in further detail below.

The rotation sensor 24 is arranged at the output shaft of the hydraulic motor 210, which is drivingly connectable to the driveline 15. The direction of the rotation of the hydraulic motor 210 is determined by rotation sensor 24, and the direction of travel of the tractor 10 can be concluded. Alternately, the sensor 24 may detect speed and direction of rotation for other components of the transmission 20, as will be described further below.

When the vehicle is stationary, a system pressure of about 15 bar may be in the fluid circuit HC. This system pressure of 15 bar results from the fact that the fluid circuit HC is supplied with a constant system pressure by a supply line SL from a constant hydraulic pump, not shown, driven by the engine of the tractor 10. As soon as the tractor 10 moves or the transmission is no longer stationary, the pressure inside the fluid circuit rises, depending on the drive torque, to a high-pressure value of over 15 bar. With an average loading of the transmission 20, a high-pressure value of 250-350 bar is provided. It may be undesirable to exceed a limit value of 500 bar, however, since otherwise overstressing of the transmission and its components would be expected.

Due to the pressure prevailing in the fluid circuit HC, the torque of the drive shaft leaving the hydraulic motor 210 is determined and therefore the traction force of the transmission unit 20.

In this situation, the first pressure sensor 22 serves to identify the presence of a PUSH condition or a PULL condition of the utility vehicle and therefore of the transmission unit 20. The term "PULL condition" is understood hereinafter to mean an operational state in which the tractor 10 is driven by the transmission unit 20. The term "PUSH condition" designates the operational state in which, in an uninterrupted positive or adhesion engagement, the tractor 10, including the transmission 20, is kept in a rotational movement by the tractor 10 itself, or the trailer 28. This can be the case, for example, with downhill travel or the onset of jack-knifing.

The detection of forward travel or reverse travel of the utility vehicle, and therefore the direction of rotation of the transmission, can be carried out by the rotation sensor 24. In this situation, the direction of rotation of the hydraulic motor 210 is detected by the rotation sensor 24. The individual directions of rotation of the hydraulic motor 210 during forward or reverse travel of the utility vehicle are in each case opposed to one another. In this situation, a PULL condition of the transmission 20, and therefore also of the tractor 10 during forward travel, creates a high pressure PH in the upper circuit UHC which is measured by the first pressure sensor 22. The high pressure PH measured is greater than a system pressure PSYS with the tractor 10 at rest.

The hydraulic output created by the hydraulic pump 200 is converted into a mechanical output by the hydraulic motor 210. Consequently, in the lower circuit LHC, which with forward movement of the vehicle corresponds to the hydraulic range which forms in the direction of flow between the hydraulic motor 210 and hydraulic pump 200, the system pressure PSYS of around 15 bar pertains. At reverse movement of the utility vehicle in pulling mode, by contrast, the system pressure PSYS pertains in the upper circuit UHC and the high pressure PH in the lower circuit LHC.

A PUSH condition on the transmission 20, and therefore also on the tractor 10 in forward movement, can be detected by the fact that in this case the hydraulic motor 210 of the transmission 20 is driven by the tractor 10 itself. Consequently, the pressure in the lower circuit LHC rises to the high pressure PH and is measured by the second pressure sensor 23. Moreover, with the tractor 10 in PUSH condition, no hydraulic output is created by the hydraulic pump 200. Rather, the hydraulic output produced by the hydraulic motor 210 is converted by the hydraulic pump 200 into a mechanical output. Consequently, the system pressure PSYS now pertains in the upper circuit UHC, which is measured by the first pressure sensor 22. With the tractor 10 in reverse travel in PUSH condition, by contrast, the high pressure PH pertains in the upper circuit UHC and the system pressure PSYS in the lower circuit LHC.

As mentioned above, the second pressure sensor 23 serves the purpose to detect if the transmission is facing any load in circuit HC. In standstill, the second pressure sensor 23 would therefore detect PSYS. If load in the circuit HC is present, the second pressure sensor 23 would detect PH. If, e.g., the tractor rolls down a hill without any PUSH/PULL condition (vehicle only overcomes friction resistance of the road contact) the second pressure sensor 23 would detect PSYS. Therefore, second pressure sensor 23 is relevant for detecting whether an indicated PUSH/PULL condition is correctly identified.

Thus, the relationship between the detected direction (via rotational speed) and the value of first pressure sensor 22 and second pressure sensor 23 enables the control system of ECU 26 to determine PUSH/PULL conditions. This is summarized in the table of FIG. 3, which also shows (in the right-hand column) that the first pressure sensor 22 may alternatively be positioned in the lower circuit LHC to detect PUSH/PULL conditions, in which the assignment of the pressures values to PUSH/PULL conditions would be opposite to that of the upper circuit UHC.

The combination of rotational speed sensor 24 plus pressure sensor 22, 23 for forward driving indicates a PUSH condition when POSITIVE rotation (=FORWARD) plus PSYS in the upper circuit are detected.

The combination of rotational speed sensor 24 plus pressure sensor 22, 23 for reverse driving indicates a PUSH condition when NEGATIVE rotation (=REVERSE) plus PH in the upper circuit are detected.

Detection of a PUSH condition by the ECU 26 is then used to trigger the actuation of the trailer braking system 34 independently of the service or parking brake of the tractor 10. The actuation of the trailer braking system (following previous detection of a PUSH condition) may be aborted or interrupted when the combination of rotational speed plus pressure sensor 22 indicates that the vehicle returns to PULL condition.

In some embodiments, the system offers a redundant system for the PUSH/PULL condition determination as explained below.

In a first check, the value determined with rotation sensor 24 (arranged at the output shaft of the hydraulic motor 210) is compared with the value of the speed sensor 21 in driveline 15. If these values do not correlate in terms of the driving direction (taking account of where in the driveline the speed sensor is located), a failure may have occurred (i.e., the identification of a PUSH condition based on the first pressure sensor 22 and rotation sensor 24 may be erroneous). In the event of failure, alternative measures are suitably triggered.

In a second (or alternative) check, the values of first pressure sensor 22 and second pressure sensor 23 are compared based on the table shown in FIG. 3. For example, if in FORWARD-PULL condition first pressure sensor 22 would measure PH while second pressure sensor 23 would deviate from PH, a failure may have occurred.

The comparison of the values in the first and second checks may be executed in a time-controlled manner (e.g., in certain time intervals) or it may be event controlled (e.g., if a change in PULL/PUSH condition or FORWARD/REVERSE travel is determined).

Providing this redundancy for the PUSH/PULL condition determination is very important in case of operating any brake system. Other triggers for the comparison may also be applicable without leaving the scope of the invention.

In the foregoing, a trailer braking system comprises a vehicle 10 having a continuously-variable hydrostatic transmission 20, and a trailer 28 coupled for towing by the vehicle and having an associated braking system 34 operable from the vehicle 10. The vehicle transmission 20 includes a first pressure sensor 22 arranged to measure a fluid pressure at a predetermined point within the transmission, and a rotation sensor 24 arranged to determine a rotation direction of a predetermined component in a driveline of the vehicle. A control unit 26 coupled to the first pressure sensor and rotation sensor determines when a PUSH condition exists based on a particular combination of pressure and rotational direction, and operates the trailer brakes 34 in response. One or more back-up systems to confirm the existence of a PUSH condition may be provided.

From reading the present disclosure, other modifications will be apparent to persons skilled in the art.

The invention claimed is:

1. A trailer braking system, comprising:
a vehicle having a continuously variable hydrostatic transmission, wherein the transmission includes a first pressure sensor arranged to measure a fluid pressure (PH, PSYS) at a predetermined point within the transmission, and a rotation sensor arranged to determine a rotation direction of a predetermined component in a driveline of the vehicle;
a trailer coupled for towing by the vehicle, the trailer having at least two wheels with trailer brakes operable from the vehicle; and
an electronic control unit (ECU) coupled to the first pressure sensor and to the rotation sensor, the ECU being configured to determine whether a PUSH condition exists based on a combination of a first output signal from the first pressure sensor indicative of fluid pressure at the predetermined point within the transmission and a second output signal from the rotation sensor indicative of the rotational direction of the predetermined component within the driveline of the vehicle, and further configured to operate the trailer brakes in response to a determination that a PUSH condition exists.

2. The trailer braking system of claim 1, wherein the vehicle transmission includes a hydrostatic pump and a hydrostatic motor connected to the pump by a first fluid line, the first pressure sensor being arranged to measure a fluid pressure (PH, PSYS) in the first fluid line.

3. The trailer braking system of claim 2, wherein the rotation sensor is configured to measure rotation direction and speed for an output shaft of the hydrostatic motor.

4. The trailer braking system of claim 3, comprising a further rotation sensor configured to measure rotation direction at a predetermined location in a driveline of the vehicle, with the ECU being configured to determine whether there is an expected correlation between the outputs of the first and second rotation sensors as a precondition to operating the trailer brakes.

5. The trailer braking system of claim 1, further comprising a second pressure sensor configured to measure a fluid pressure at a second predetermined point within the transmission, with the ECU being configured to determine whether there is an expected correlation between the outputs of the first and second pressure sensors as a precondition to operating the trailer brakes.

6. The trailer braking system of claim 1, further comprising a second system configured to determine when a PUSH condition exists, with the ECU being configured to determine whether there is an expected correlation between the determinations by the first and second systems as a precondition to operating the trailer brakes.

7. The trailer braking system of claim 2, wherein the hydrostatic pump and the hydrostatic motor are also connected by a second fluid line, the system further comprising a second pressure sensor fluidly connected with the first and second fluid lines such that the second pressure sensor measures a higher fluid pressure of either of the first and second fluid lines.

8. A method of operating the trailer braking system of claim 1, the method comprising:
determining, based on an output signal from the first pressure sensor, whether the fluid pressure at the predetermined point within the transmission is at or above a system pressure (PSYS);
determining, based on an output signal from the rotational sensor, whether the vehicle is moving in a forward direction or a rearward direction;
determining whether a PUSH condition exists based on a correlation between the determined direction of travel of the vehicle and whether the fluid pressure at the predetermined point within the transmission is at or above the system pressure (PSYS); and
sending an operating signal to the trailer brakes responsive to the PUSH condition.

* * * * *